3,202,567
FLAME RETARDANT FIRE BARRIER CONSTRUCTIONS
Richard L. Muri, Ashland, and Ronald E. Collette, Natick, Mass., assignors to Ludlow Corporation, a corporation of Massachusetts
No Drawing. Filed Sept. 24, 1962, Ser. No. 225,904
3 Claims. (Cl. 161—162)

This invention relates to fireproofing, and more particularly to improved flame retardant barrier constructions embodying novel emulsion type laminants.

The flame retardant barriers currently employed for flame resistant jacketing, facing materials in duct insulation and similar uses, embodying plies of combustible sheet material or plies of such material laminated to foil, are of two general types. In one type the laminant comprises hot melt type adhesives which are non-burning and incorporate substantial amounts of snuffing action components. Because of the relatively large amounts of laminant employed in such hot melt type it is possible to incorporate sufficient amounts of the potentially reactive fire retarding agents to mitigate or overcome the burning of various untreated substrates.

The second type of construction comprises various paper, film and foil combinations laminated with an emulsion type adhesive. Such adhesives are non-burning but, as contrasted to the hot melt type, possess little if any potential fire retarding action. Because of the relatively small amounts of the emulsion type adhesive employed in fire barrier plied constructions and the correspondingly minor fire retardant action the substrates employed therewith must have poor burning characteristics as presented for example by foil, vinyl film and krafts pretreated to impart flame resistance.

The requirements of certain uses of flame barrier construction impose specifications which are difficult to satisfy. Thus the Underwriters Laboratory 90A Ratings require a flame spread of 25 or less, smoke development of 50 or less and the less demanding 90B rating requires a flame spread of 50 or less and smoke development of 100 or less based on the following standards:

| | | | | |
|---|---|---|---|---|
| Cement board | 0 | Flame | 0 | Smoke |
| Red Oak | 100 | Flame | 100 | Smoke |

The test procedure to determine these values is set forth in a publication, Underwriters Laboratory Inc., Subject 723, published August 1950.

A satisfactory flame resistant foil to paper barrier should also display a moisture vapor transmission resistance of 0.5 perms or less at 73° F. and 50% relative humidity and possess all these values after accelerated ageing for a period of one month at 120° F. and 100% relative humidity. Furthermore the adhesive qualities of the emulsion type laminant must be such as to insure an intimate and permanent bond to foil and paper substrates. Finally, and not the least in importance, the emulsion type adhesive should have no corrosive action on the metal foil of the laminant, or deleterious effect on the other portions of the laminated construction.

Heretofore flame retardant barrier comprised of aluminum foil and flame resistant kraft laminated with emulsion type adhesives have been produced which has passed Underwriters Laboratory requirements as to flame spread and smoke development. In such products the adhesive is compounded with neoprene and other non-burning polymers and contain substantial amounts of sodium antimonate and metallic oxides known to the art, such as oxides of antimony, arsenic, bismuth, lead, iron and zinc. While these prior laminants do present satisfactory flame spread and smoke development characteristics they do have an outstanding disadvantage which is not apparent under the described testing procedure, namely their corrosive action on aluminum foil over a period of time.

The reasons for this are not entirely clear but may be due in some considerable part to the fact the sodium antimonate, being a basic salt contributed to a corrosive alkaline environment for the contacting foil, or in some cases may be due to a galvanic action between the metal oxide and the foil at high humidities.

A major object of the invention is to provide improved flame retardant barrier constructions embodying highly effective emulsion type laminants.

Another object of the invention is to provide an improved composition comprising a non-burning adhesive embodying selected hydrogen halide-evolving material suitable for wet lay up application to plies of a flame retardant barrier construction.

An additional object is to provide a flame resistant barrier construction of paper/foil, paper/film, foil/film, film/film, foil/foil, paper/paper embodying a flame resistant, moisture resistant adhesive which is non-corrosive to the foil.

A further object is to provide a flame resistant barrier construction embodying a foil ply and a relatively light coated paper ply laminated with non-burning flame resistant adhesive which is non-corrosive to the foil.

As noted previously a major desideratum in flame retardant barrier constructions incorporating foil plies is a non-corrosive emulsion type laminant which effectively and permanently bonds foil, film, paper, substrates, imparts moisture resistance and a selected degree of moisture vapor penetration resistance to the construction at ambient temperature conditions and provides effective flame blanketing action at flaming temperatures. In products produced in the past certain but not the total of these desirable characteristics have been obtained. As a result of extensive research and investigation it has been found that emulsion type adhesives possessing the enumerated desirable characteristics may readily be formulated and utilized in a simple wet lay up process to economically product most effective flame retardant constructions.

Considered briefly the improved laminant of the present invention is based on the concept of using a non-corrosive, non-chlorinated polymer as the base adhesive in a novel correlation with selected halogenated plasticizers such as chlorinated and brominated flame blanketing plasticizers and adhesive modifiers to attain the desired low flame, low smoke and corrosive resistance in the adhesive system.

General a priori considerations would lead to the expectation that latices of acrylic resins and polyvinyl acetate copolymers would constitute most satisfactory adhesive components for emulsion type laminants. These resins provide excellent bonding to various substrates, excellent water resistance and aging characteristics. It was found however that they do not prove satisfactory for use in fire barrier constructions. Specifically it was ascertained that a fire barrier construction comprised of a 65 lb. intumescent coated kraft, glass scrim and foil laminated with an emulsion comprised of 37.6% polyacrylate, 7.7% polyvinylidine chloride, 27.5% chlorinated paraffin (70%), 13.6% antomony oxide and 13.6% titanium dioxide when tested by the Underwriters Laboratory procedure gave a smoke rating of 75 and a flame spread of 40, which were considerably in excess of the permissible high standard of rating 90A.

It was evident from such tests that despite their intrinsic satisfactory adhesive characteristics, these compounds, because of their chemical structures are relatively flammable and require a large and inordinate amount of non-burning material to effectively stop their burning.

In continuing study of the problem of developing satisfactory emulsion type laminates it was found that, although not possessing the inherent adhesiveness and water resistant properties of the copolymers, the polyvinyl homopolymers and homologues such as polyvinyl butyral, polyvinyl acetals and polyvinyl alkyl ethers, have better flame resistance and lower smoke values and that effective adhesiveness, and water resistance could be conferred on the laminant by the incorporation of functional adjuvants in the emulsion.

It was further emphirically ascertained that the flame resistant plasticizers commonly used with polyvinyl acetate, as for example in molded products, were unsuited for use in the flame retardant laminant. These plasticizers, such as tricresyl phosphate, triphenyl phosphate, cresyl diphenyl phosphate and alkyl-aryl phosphate, when incorporated with polyvinyl acetate in an emulsion laminant gave unsatisfactory high smoke ratings.

As is pointed out in copending application Serial No. 225,903 filed September 24, 1962 in course of investigation of hot melt type laminant, it was found that the main factors contributing to low flame spread in such flame retardant constructions are the amount of available hydrogen chloride vapor produced, the rate at which it is generated and subsequently the rate of pyrolysis of the paper substrate. It appears from such investigations that the dominant factor contributing to low flame spread is not, as was generally supposed, due to a so called snuffing action by flame retardant gases, but rather to the rapid pyrolysis of the organic sheet material by the evolved hydrochloric acid vapors, effecting a reduction of tarry distillates which contribute to flaming, an increasing of the non burning carbonaceous residue and a dilution of the flammable gases developed during pyrolysis. It was also found that the addition of certain inorganic compounds enhances or catalyzes the dehydrochlorination of chlorinated hydrocarbon components of the laminant and the resulting rate of pyrolysis. It was also determined, contrary to previous assumptions, that it was not essential that the evolved hydrogen chloride be converted to dense metal chloride vapor, such as antimony oxychloride, but that effective lowering of flame spread could be achieved without the use of antimony, arsenic or bismuth salts or oxides. The incorporation of such salts or oxides may be desirable in some circumstances since they appear to act primarily to reduce the amounts of smoke developed and to dilute the flammable gases.

According to the present invention improved nonburning emulsion type laminants may be formulated by blending selected halogen-halide-envolving plasticizers, tackifiers and fillers in a dispersion of polyvinyl acetate to produce a plasticized polyvinyl acetate emulsion which may readily be applied as a laminant to foil and paper substrates to produce a barrier construction characterized by low flame spread, low smoke development.

The flame retardant plasticizing component of the adhesive preferably comprises one or more halogenated phosphate esters. It has been found as a result of numerous tests that aliphatic chemicals tend to produce less smoke than their aromatic analogues; hence the plasticizers of choice comprise halogenated aliphatic phosphate esters. Particularly effective members of this group are tris-dibromo propyl phosphate, trisbeta-chloroethyl phosphate, tris-dichloro-propyl phosphate and tris chlorobromo propyl phosphate. In some cases it may be found desirable to incorporate halogenated primary plasticizers or non halogenated phosphate ester primary plasticizers in the adhesive but these should be employed in minimal amounts since they tend to interfere with the dehydrochlorination reaction on which the fire retardant action depends.

A salient feature of the invention is the incorporating of the described secondary halogenated phosphate ester plasticizers in the adhesive in amounts conducive to rapid and effective pyrolysis and flame blanketing. Such compounds not only serve to plasticize the adhesive system but act directly as hydrogen-halide generators at flaming temperatures. It is to be noted at this point that the density of the gases generated on ignition is a most important factor in smothering of flame with the volume being of secondary importance. The halogenated secondary plasticizers and especially the brominated phosphate esters function most effectively, quickly liberating a very dense, flame smothering gas at decomposition temperatures. The chlorinated phosphate ester secondary plasticizers, when embodied in the laminant, function similarly to but are not as effective as the brominated esters for equivalent additions. The marked effectiveness of the described halogenated plasticizers as flame retardants appear to be due in no small part to the rapidity of evolution of hydrogen halide therefrom at temperatures in the vicinity of flame temperatures. For some purposes it may be desirable to incorporate in the laminant small amounts of inorganic compounds, such as antimony or bismuth salts or oxides to donate the metallic elements rendered available by high temperature decomposition to combine with hydrogen halides to form heavy flame smothering vapor of the metal oxychloride, i.e. antimony oxybromide and/or antimony oxychloride. In this respect it is to be noted that bromine being a more active halogen than chlorine will tend to preferentially react before chlorine to institute the pyrolysis reaction. Furthermore, the vapors of hydrogen iodide and hydrogen bromide are considerably denser than those of hydrogen chloride and would provide, for quantitively equal volumes, a greater flame blanketing action. Similarly when small substantially stoichiometrical amounts of antimony oxide or antimony salts are incorporated in the laminant the dense antimony oxybromide formed at the combustion temperatures is of greater density than the corresponding oxychloride and would be retained much more effectively on the surface of the paper to provide effective flame blanketing action.

It has been ascertained that the judicious use of fillers to modify the physical properties of the base adhesive is particularly important producing superior flame retardant constructions. The use of fillers in the optimum amount to sufficiently reduce the plasticity of the adhesive without reducing bond strength contributes to low flame spread. In accordance with the invention suitable inert fillers such as clay, titanium dioxide, talc, calcium carbonate, wollastonite, and magnesium carbonate, dolomitic limestone and the like in amounts of about 2% to about 9% are incorporated in the adhesive.

Certain compounds may be employed which serve as fillers and also function as dehalogeneration catalysts at flaming temperatures. Examples of such agents are oxides and carbonates of zinc, magnesium, lead and iron; oxides of calcium, antimony, bismuth, tin and titanium and borates of zinc, lead and magnesium.

It is found also that inorganic hydrates such as hydrated magnesium carbonate and aluminum trihydrate function as catalytic agents in the flame retardant mechanism. Such addition agents, on dehydration at flame temperature, supply moisture and impart higher reactivity to evolved hydrogen chloride and hydrogen bromide, as compared to that of the dry gases. The incorporation of magnesium carbonate also insures the rapid evolution of carbon dioxide which tends to rupture paper substrates exposing the adhesive to the flame. The evolved carbon dioxide, because of its known blanketing effect supplements the action of the evolved hydrogen halides.

It has also been found advantageous to impart a relatively high degree of initial tackiness to the adhesive to insure rapid bonding of the plies, such as foil and paper in the wet lay up laminating process. For this purpose preferred adhesive formulations include sulfonamide-formaldehyde resin in amounts of the order of from about 4% to about 20% and preferably about 8% to 12%. Other similarly functioning tackifers may be used in lieu of or in conjunction with the sulfonamide formaldehyde resin, such as tackifying urea-formaldehyde, melamine-formaldehyde resins and the like.

It has been found that the physical and physicochemical properties of the adhesive such as flexibility, toughness and adhesiveness may be enhanced by including in the dispersion small amounts of elastomeric polymers such as neoprene, butadiene-styrene, butadiene-acrylonitrile, styrene-acrylonitrile, acrylates, and polyvinyl chloride latices. Similarly adjuvants such as caseinates, resin-modified casein and the like may be included in the emulsion to enhance the water resistance. Such adjuvants should not be added in such amounts as would detract from the flame and smoke characteristic of the laminant.

The following examples are illustrations of emulsion type adhesives produced according to the invention:

*Example I*

Parts by dry weight
Polyvinyl acetate homopolymer emulsion (55% solid) _____ 59.4
Triethyl phosphate _____ 18.2
Tris-chlorobromopropyl phosphate _____ 4.3
Sulfonamide-formaldehyde resin _____ 11.5
Titanium dioxide _____ 6.6

*Example II*

Polyvinyl acetate emulsion (55%) _____ 60.5
Triethyl phosphate _____ 14.6
Tris-dibromo propyl phosphate _____ 7.3
Sulfonamide-formaldehyde resin _____ 11.1
Titanium dioxide _____ 6.5

*Example III*

Polyvinyl acetate emulsion (55%) _____ 75.7
Tris-beta chloroethyl phosphate _____ 18.3
Sulfonamide-formaldehyde _____ 6.0

*Example IV*

Polyvinyl acetate emulsion (55%) _____ 67.6
Triethyl phosphate _____ 14.9
Tris-chlorobromo propyl phosphate _____ 4.9
Sulfonamide-formaldehyde resin _____ 4.9
Titanium dioxide _____ 7.7

*Example V*

Polyvinyl acetate emulsion (55%) _____ 66.0
Tris-beta chloroethyl phosphate _____ 16.0
Tris-dibromo propyl phosphate _____ 3.8
Sulfonamide-formaldehyde resin _____ 7.7
Clay _____ 6.5

*Example VI*

Polyvinyl acetate _____ 73.0
Tris-beta chloroethyl phosphate _____ 19.3
Sulfonamide-formaldehyde resin _____ 5.7
Clay _____ 2.0

*Example VII*

Polyvinyl acetate _____ 71.1
Tris-beta chloroethyl phosphate _____ 15.5
Sulfonamide formaldehyde resin _____ 8.3
Titanium-dioxide _____ 5.1

Such adhesives may readily be made up by blending the plasticizers, adjuvants and fillers together with water into the 55% polyvinyl acetate dispersion to produce a plasticized polyvinyl emulsion of suitable working viscosity as for example between 1000 and 5000 cps.

In manufacturing a typical fire barrier construction aluminum foil of various weights is coated with a selected emulsion adhesive on a reverse roll laminator, reinforced with fiberglass scrim and laminated to kraft and then dried either at ambient temperatures or, preferably, over steam heated drums providing a temperature of 200°–250° F. The emulsion is applied to the substrates at the rate of 7 to 13 lbs. (dry weight) per 3000 square foot. In such typical construction the foil may be 1/3 mil or 2/3 mil aluminum foil, weighing respectively 15 lbs. and 29 lbs. per 3000 square foot. The kraft may be a flame resistant treated kraft or an intumescent coated kraft of the type described in the copending application referred to.

It will be understood that the invention comprehends also the production of paper/film, film/film and foil/film combinations employing films of, for example, polyvinyl chloride, polyvinylidiene chloride, polyvinyl fluoride and copolymers, polyesters, polyethylene, irradiated polyethylene, chlorinated polyethylene, polypropylene, chlorinated polypropylene, nylon, teflon, polycarbonate and the like.

Fire resistant barrier constructions made of 2/3 mil foil, glass scrim and flame resistant treated kraft laminated with the adhesives of Examples I to VII were tested by the Underwriters Laboratory procedure and the following results were observed:

| | Flame Spread | Smoke Developed |
|---|---|---|
| Example I | 23 | 21 |
| Example II | 26 | 24 |
| Example III | 26 | 18 |
| Example IV | 39 | 49 |
| Example V | 27 | 26 |
| Example VI | 29 | 22 |
| Example VII | 31 | 17 |

Since the Underwriters Laboratory ratings round off to the nearest 5 it will be seen that barrier constructions laminated with the adhesive of Examples I, II, III and V fully comply with the established difficulty satisfied commercial specifications of U.L. Rating 90A and that the products of Examples IV, VI and VII comply with Rating 90B. The results of the tests of the several laminants also illustrate the specificity of action or effect of the several components on the pyrogenic characteristics of the barrier construction and particularly the marked functional benefits conferred by the association of the chlorinated and brominated secondary plasticizers with a base polymer having the characteristics of polyvinyl acetate.

It is particularly to be observed that the improved emulsion type laminants described herein present numerous advantages when embodied in flame resistant barrier constructions. The intrinsic effectiveness of the laminant permits the construction of low cost efficient flame retardant barriers which incorporate lightweight intumescent-coated kraft in lieu of the more expensive impregnated heavier kraft employed heretofore.

The laminates described herein are durable, strong, flexible and are characterized by moisture resistance and moisture vapor penetration resistance and when incorporating aluminum foil develop no corrosion in use.

While preferred modifications of the invention have been described it will be understood that these are given as illustrative of the underlying principles of the invention. Various modifications and changes in the laminant compositions will occur to those skilled in the art, and to the extent such changes and modifications are embraced by the appended claims they are considered to be comprehended by the invention.

What is claimed and desired to be secured by United States Letters Patent is:

We claim:

1. A flame retardant barrier construction characterized by low flame spread and smoke development comprising plies of low burning characteristics selected from the group consisting of metal foil, plastic film, and paper, which plies are adhered together with a non-burning laminant which liberates fire extinguishing products under combustion conditions comprising, an intimate blend of vinyl acetate homopolymer, a tackifier selected from the group consisting of sulfonamide-formaldehyde, urea-formaldehyde and melamine-formaldehyde resins, a filler selected from the group consisting of titanium dioxide, clay, talc, calcium carbonate, calcium silicate, magnesium carbonate, dolomitic limestone and mixtures thereof and a plasticizer adapted to evolve hydrogen halide rapidly at flaming temperatures selected from the group consisting of tris-beta-chloro ethyl phosphate, tris-dichloro propyl phosphate, tris-chloro bromo propyl phosphate and tris-dibromo propyl phosphate.

2. A flame retardant barrier construction according to claim 1 in which the said laminant blend includes an elastomer selected from the group consisting of neoprene, butadiene-styrene, butadiene-acrylonitrile and styrene-acrylonitrile.

3. A flame retardant barrier construction according to claim 1 in which the said plastic film ply is selected from the group consisting of polyvinyl chloride, polyvinyl fluoride, polyvinylidene chloride and copolymers thereof, and in which the said non-burning laminant contains from about 55% to about 70% by wt. of said vinyl acetate homopolymer, from about 4% to about 14% by wt. of said tackifier, from about 6% to about 25% by wt. of the said plasticizer and from about 1% to about 10% by wt. of said inert filler.

References Cited by the Examiner

UNITED STATES PATENTS

| | | | |
|---|---|---|---|
| 1,961,108 | 5/34 | Leatherman | 106—15 |
| 2,330,253 | 9/43 | Whitehead | 106—15 |
| 2,488,034 | 11/49 | Pingree et al. | 161—403 X |
| 2,563,898 | 8/51 | Wilson et al. | 260—29.4 |
| 2,675,327 | 4/54 | Gearhart | 106—15 |
| 2,813,046 | 11/57 | Lauring. | |
| 2,863,843 | 12/58 | Scott et al. | 260—29.4 |
| 3,034,939 | 5/62 | Newkirk et al. | 161—403 X |

ALEXANDER WYMAN, *Primary Examiner.*

MORRIS SUSSMAN, EARL M. BERGERT, *Examiners.*